D. S. LANSDOWNE.
JACK SCREW.
APPLICATION FILED OCT. 8, 1914.
1,154,519.
Patented Sept. 21, 1915.
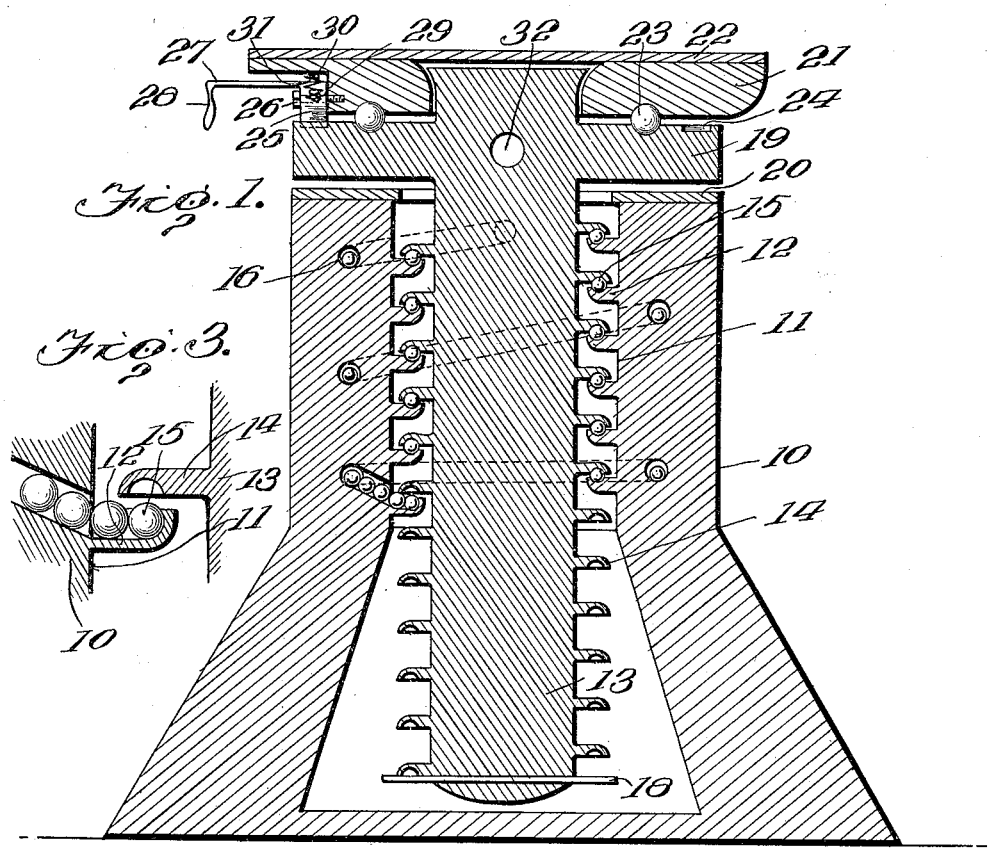
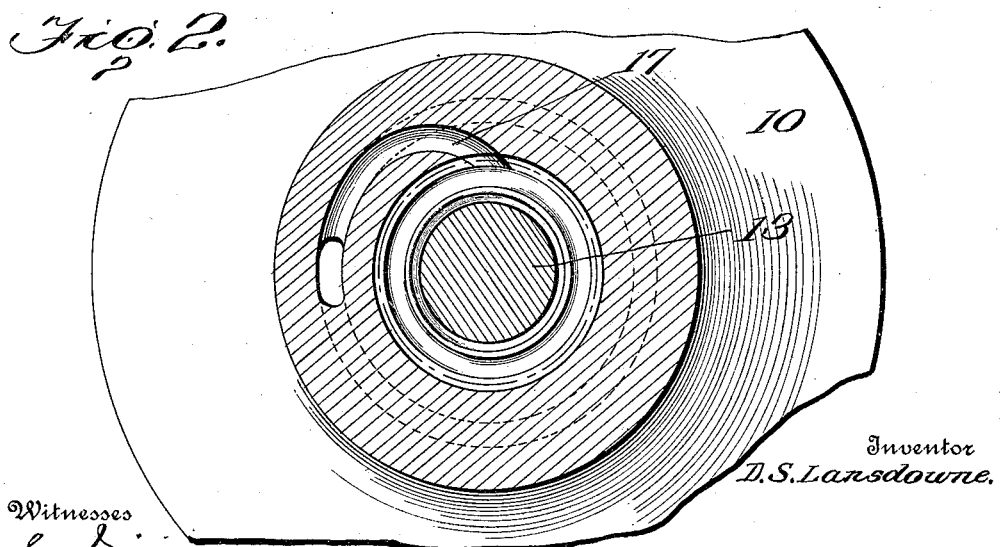
Witnesses
Inventor
D. S. Lansdowne.
By
Attorney

UNITED STATES PATENT OFFICE.

DAVID S. LANSDOWNE, OF MULVANE, KANSAS.

JACK-SCREW.

1,154,519.   Specification of Letters Patent.   Patented Sept. 21, 1915.

Application filed October 3, 1914. Serial No. 865,743.

*To all whom it may concern:*

Be it known that I, DAVID S. LANSDOWNE, citizen of the United States, residing at Mulvane, in the county of Sumner and State of Kansas, have invented certain new and useful Improvements in Jack-Screws, of which the following is a specification.

This invention relates to jack screws and has as its primary object to provide an improved device of this character wherein friction between the movable parts thereof disposed to support the load will be reduced to a minimum to the end that the efficiency of the jack may be enhanced.

The invention has as a further object to provide an improved jack which may be quickly and easily lowered when supporting the weight of a load and wherein means will be provided for positively maintaining the screw stationary at any point in its vertical movement when supporting a load. And the invention has as a still further object to provide a jack which will be simple in construction and which will include but few parts to thus comprise a structure which will not be liable to get out of order.

With these and other objects in view, my invention will be more fully described, illustrated in the accompanying drawings and then specifically pointed out in the claims which are attached to and form a part of this application.

In the drawings:—Figure 1 is a vertical sectional view of my improved jack, Fig. 2 is a transverse sectional view thereof more particularly illustrating the formation and disposition of the ball race provided in the body portion of the jack, and Fig. 3 is a fragmentary sectional view showing the manner in which the anti-friction devices employed are adapted to leave the ball race of the base of the jack to enter the ball race between the coacting screw threads thereof as well as the manner in which the said anti-friction devices are adapted to leave the said last mentioned ball race to enter the ball race of the base.

Corresponding and like parts are referred to in the following description and indicated in all the views of the drawings by the same reference characters.

Referring more particularly to the drawings, my improved jack includes a body portion or base 10 which is hollowed to provide a circular bore 11 at its upper extremity, the said base being preferably flared outwardly at its lower extremity to provide an increased bearing surface. Formed in the bore 11 are screw threads 12, the upper faces of which are grooved medially for a purpose which will presently appear.

Extending within the base 10 is a screw 13 which is provided with screw threads 14, the lower faces of which are also grooved medially.

It will be observed that the grooved faces of the threads 12 and 14 are disposed to coincide to provide a ball race in which balls 15 are disposed, and formed in the body portion of the base 10, at the upper extremity thereof, is a spirally arranged ball race 16 also disposed to receive the balls 15.

The arrangement of the ball race 16 is more particularly illustrated in Fig. 2 of the drawings and it will be observed that at the upper terminal of the screw threads 12 or at the point where the threads 14 of the screw are disposed to leave the threads 12, the upper face of the adjacent thread 12 is grooved radially and at an angle tangential to the axis of the screw to provide a mouth 17 leading into the upper extremity of the ball race 16 and communicating with the ball race formed by the grooves in the threads 12 and 14. By this arrangement, it will be observed that when the screw 13 is rotated and the balls disposed between the threads thereof are moved upwardly between the said threads to the point where the threads 14 of the screw leave the threads 12 of the base, the said balls will enter the mouth 17 and will thence move into the ball race 16.

At its lower extremity, the ball race 16 is provided with a mouth similar to the mouth 17, the said last mentioned mouth of the race being disposed to feed the balls 15 into the ball race between the threads at the point where the said threads are disposed to come into operative relation to each other so that as the screw 13 is turned upwardly, the ball race 16 will receive the balls 15 at its upper extremity and will feed the balls to the ball race between the threads 12 and 14 at its lower extremity. By this arrangement it will be seen that friction between the screw 13 and the base 10 will be reduced to a minimum.

Detachably connected with the screw 13 at its lower extremity, is a pin 18 disposed to limit the screw in its upward movement within the base 10 and formed on the said screw adjacent its upper extremity is an annular collar 19. Detachably connected to the upper extremity of the base 10 in any suitable manner and surrounding the screw 13 is preferably arranged a plate 20, the said plate being disposed to prevent dirt or other foreign matter from gaining entrance within the base 10.

At its upper extremity, the screw 13 is overturned to loosely engage a head 21 to the upper face of which is detachably secured a wear plate 22. The confronting faces of the head 21 and collar 19 are provided with coinciding annular grooves to form a ball race in which are disposed balls 23. By this arrangement, it will be observed that the head 21 will turn freely upon the screw 13 and that friction between the head and the said screw, owing to the presence of the balls, will also be reduced to a minimum.

Formed in the outer margin of the upper face of the collar 19 is an annular rack 24 and arranged within a suitable recess formed in the inner wall of the head 21 upon one side thereof is a pawl 25 disposed to engage the rack 24.

The pawl 25 is detachably secured to the head 21 and is pivotally mounted upon a bolt or other suitable pivot pin 26 having screw threaded engagement with the head 21, the said pawl being provided with a radially extending arm 27 upon which is formed a handle 28. Upon its upper face, the pawl 25 is provided with a lug 29 and arranged upon the head 21 opposite the lug 29 is a similar lug 30. Surrounding the lugs 29 and 30 and bearing between the pawl and the head, is a helical spring 31 disposed to normally maintain the pawl in engagement with the rack 24.

It will be observed that when the head 21 is in engagement with a load, that the pawl 25 will prevent the turning of the screw 13 relative to the head, and the said pawl is thus disposed to maintain the screw 13 stationary at any point in its vertical movement within the base 10. However, it will be seen that the pawl 25 may be readily disengaged from the collar 19 by the handle 28, when owing to the pressure of the load upon the head, the screw 13 will be caused to rotate upon the balls 15 to thus release the jack. It will be apparent that this is a very desirable feature of my invention since the jack may be disengaged from the work without the necessity of manually turning the screw 13 within the base. To engage the jack with the work, the base 10 at its upper extremity is provided with a bore 32 in which a suitable bar may be engaged.

It will therefore be seen that I provide a very simple and efficient construction for the purpose set forth wherein friction between the movable parts of the jack disposed to support the load, will be reduced to a minimum and wherein by a simple and efficient arrangement, the screw of the jack may be held stationary at any point in its vertical movement.

Having thus described my invention, what I claim and desire to secure by Letters Patent is:—

1. A device of the character described including a base, a screw operatively connected with the base and provided with a collar having a rack formed therein, a head mounted to turn upon the screw, said head being cut away to receive a pawl, and a pawl mounted within said cut away portion of the head and disposed to normally engage said rack for connecting the head with said collar, the said pawl being provided with an arm extending laterally of the head upon one side thereof.

2. A device of the character described including a base, a screw operatively connected therewith and provided with a collar having a rack formed therein, a head mounted to turn upon the screw, said head being recessed upon its inner face to receive a pawl, a pawl detachably mounted within said recess, a spring bearing between the head and the pawl and disposed to normally maintain the pawl in engagement with said rack for operatively connecting the head with said collar, and an operating arm formed on said pawl and arranged to extend laterally of the head upon one side thereof.

3. A device of the character described including a base, a plunger adjustable upon the base and provided with a collar, a head confronting the collar and having an opening formed therein freely receiving the adjacent terminal of the plunger, anti-friction devices interposed between the collar and the head, a wear plate connected to one side of the head and closing the opening formed therein at its outer end, the anti-friction devices supporting the head with said plate disposed in spaced relation to the adjacent terminal of the plunger, and a pawl mounted upon the head and adapted to engage the collar for holding the head stationary relative to the collar, the said pawl having an operating arm formed thereon projecting upon one side of the head.

In testimony whereof I affix my signature in presence of two witnesses.

DAVID S. LANSDOWNE. [L. S.]

Witnesses:
G. W. RADFORD,
F. W. LIETZKE.